(12) United States Patent
Kirimoto et al.

(10) Patent No.: US 6,557,671 B1
(45) Date of Patent: May 6, 2003

(54) CABLE DISC BRAKE

(75) Inventors: Kanji Kirimoto, Kaizuka; Tsuyoshi Sakashita, Koube, both of (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/531,570

(22) Filed: Mar. 20, 2000

(51) Int. Cl.$^7$ ................................. B62L 3/02
(52) U.S. Cl. ....................... 188/26; 188/72.7
(58) Field of Search .................. 188/26, 72.7

(56) References Cited

U.S. PATENT DOCUMENTS

| | | | |
|---|---|---|---|
| 3,765,511 A | * 10/1973 | Toyomasu | 188/26 |
| 3,789,959 A | 2/1974 | Kawaguchi | |
| 3,878,921 A | * 4/1975 | Kibler et al | 188/26 |
| 3,920,102 A | 11/1975 | Ito | |
| 3,949,838 A | 4/1976 | Fuhrman | 188/26 |
| 3,989,124 A | 11/1976 | Fujii | 188/26 |
| 4,022,299 A | 5/1977 | Haraikawa | |
| 4,162,720 A | 7/1979 | Haraikawa | |
| 4,170,369 A | 10/1979 | Strutman | 280/261 |
| 4,284,176 A | 8/1981 | Haraikawa et al. | |
| 4,454,933 A | 6/1984 | Hunnicutt et al. | |
| 4,633,978 A | 1/1987 | Hoff | |
| 5,082,092 A | 1/1992 | Yoshigai | |
| 5,201,402 A | 4/1993 | Mott | |
| 5,358,078 A | 10/1994 | Gajek et al. | 188/72.4 |
| 5,390,771 A | 2/1995 | Hinkens et al. | 188/344 |
| 5,960,914 A | 10/1999 | Isai | |
| 5,979,609 A | * 11/1999 | Tsai | 188/26 |
| 6,206,144 B1 | 3/2001 | Di Bella | |

FOREIGN PATENT DOCUMENTS

| | | |
|---|---|---|
| EP | 0 791 531 A2 | 8/1997 |
| JP | 4894132 | 12/1973 |

* cited by examiner

*Primary Examiner*—Matthew C. Graham
(74) *Attorney, Agent, or Firm*—Shinjyu Global IP Counselors, LLP

(57) ABSTRACT

A bicycle cable disc brake is provided with a cam assembly that has improved efficiency during movement under high pressure. Basically, the cable disc brake has a cable housing, a pair of friction members and an actuated mechanism. The first friction member is movably coupled to the caliper housing between a release position and a braking position. The second caliper is also coupled to the caliper housing and arranged substantially parallel to the first friction member to form a rotor receiving slot therebetween. The actuated mechanism is movably coupled to the caliper housing to move the first friction member from the release position towards the second friction member to the braking position. The actuated mechanism has a pair of cam members movably arranged between an axially retracted position and an axially extended position with a guide member interconnecting the cam members during movement between the axial retracted position and the axially extended position. In the preferred embodiment, the guide member is a guide pin that extends from one of the cam members and is received in a bore of the other cam member.

36 Claims, 18 Drawing Sheets

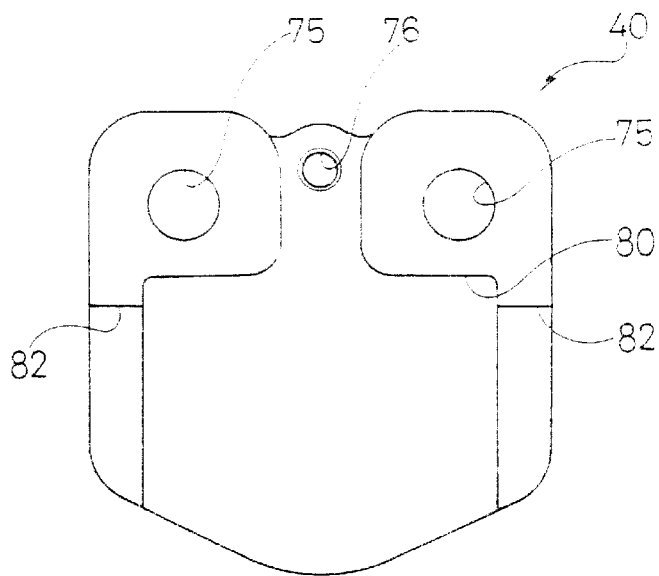
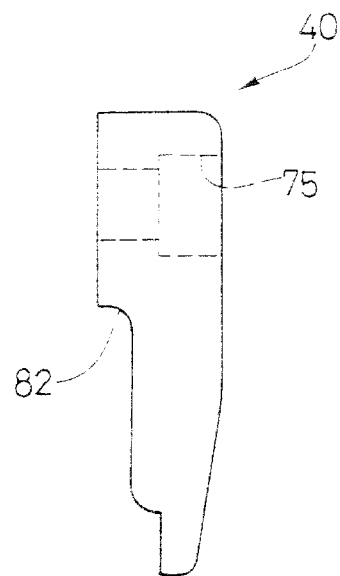
FIG. 18  FIG. 19
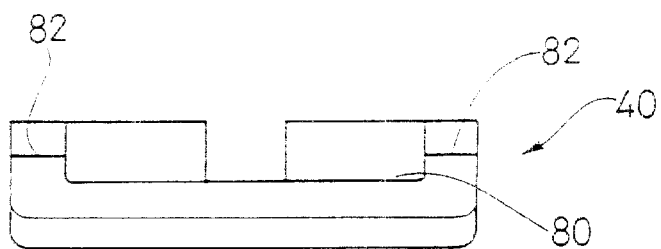
FIG. 20

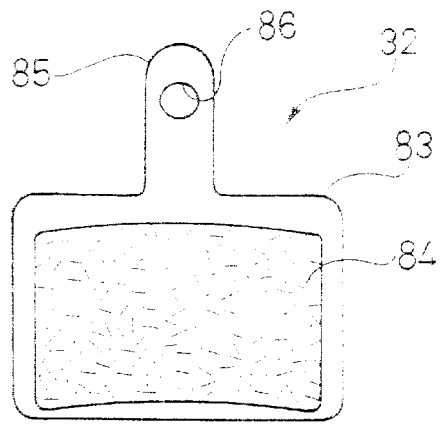 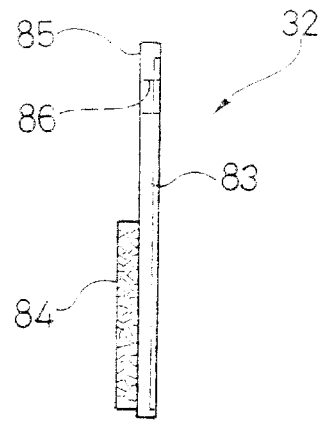
FIG. 21   FIG. 22
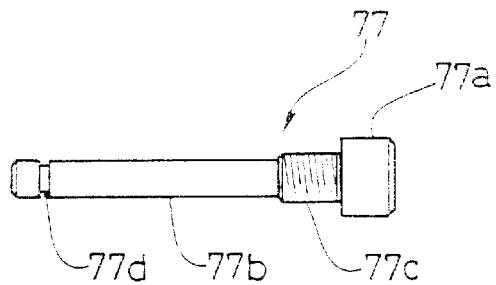 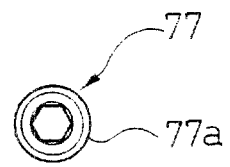
FIG. 23   FIG. 24

CABLE DISC BRAKE

BACKGROUND OF THE INVENTION

1. Field of the Invention

This invention generally relates to a cable operated disc brake for a bicycle. More specifically, the present invention relates to a cable operated disc brake with cam members for moving a friction member.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. One particular component of the bicycle, which has been extensively redesigned over the past years, is the braking systems of bicycles. In particular, the braking power of the braking systems is constantly being increased.

There are several types of bicycle brake devices, which are currently available on the market. Examples of some types of common bicycle brake devices include rim brakes, caliper brakes and disc brakes. If a rider wants a very high performance brake system, then the rider typically wants a disc brake system. Disc brake systems provide a substantial braking power in relationship to the amount of braking force applied to the brake lever. Moreover, disc brake systems typically provide a high level of consistency in all types of weather and riding conditions. Of course, riders constantly desire better performance from disc braking systems, i.e., disc brake systems that have more braking power.

Conventionally, a disc brake is composed of a pair of brake pads that are movably mounted to a caliper housing. The brake pads are pressed against a disc or rotor that is fixed to the wheel to halt the rotation of the disc and thus the wheel. The brake pads are moved toward the disc hydraulically or mechanically such as by a cam mechanism. The hydraulic disc brake systems are typically complicated in construction and expensive to manufacture. Moreover, hydraulic disc brake systems are often quite heavy in construction.

The mechanical disc brake system includes a caliper housing with one brake pad that is fixed to the caliper housing and one brake pad that is movably mounted to the caliper housing by a cam mechanism. A swinging arm is coupled to the cam mechanism to move the movable pad by a cam action. Typically, a conventional brake cable is coupled to a brake lever to move the swinging arm, and thus, operate the cam mechanism. While mechanical disc brake systems are typically less expensive and lighter than hydraulic disc brake systems, mechanical disc brake systems can still be complicated in construction and require many parts resulting in expensive manufacturing costs, as with a hydraulic disc brake system. Another drawback of many mechanical disc brake systems is that the cam mechanism often has a loss of efficiency during a movement of the cam mechanism under high pressure.

In view of the above, there exists a need for a disc brake, which overcomes the problems of prior art disc brakes. This invention addresses this need in the prior art as well as other needs, which will become apparent to those skilled in the art from this disclosure.

SUMMARY OF THE INVENTION

One object of the present invention is to provide a cable disc brake that prevents loss of efficiency during a movement of the cam mechanism under high pressure.

Another object of the present invention is to provide a cable disc brake that is relatively compact and lightweight in relation to the amount of braking power.

Another object of the present invention is to provide a cable disc brake that is relatively inexpensive to manufacture.

The foregoing objects can be basically attained by providing a cable disc brake comprising a caliper housing, a first friction member, a second friction member and an actuated mechanism. The first friction member is movably coupled to the caliper housing between a release position and a braking position. The second friction member is coupled to the caliper housing and arranged substantially parallel to the first friction member to form a rotor receiving slot therebetween. The actuated mechanism is movably coupled to the caliper housing to move the first friction member from the release position towards the second friction member to the braking position. The actuated mechanism has first and second cam members movably arranged between an axially retracted position and an axially extended position with a guide member interconnecting the first and second cam members during movement between the axially retracted position and the axially extended position.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 18 is an inside elevational view of the right caliper portion of the front cable disc brake illustrated in FIGS. 2 and 4–6;

FIG. 19 is a side elevational view of the right caliper portion of the front cable disc brake illustrated in FIGS. 2 and 4–6;

FIG. 20 is a bottom plan view of the right caliper portion illustrated in FIGS. 18 and 19 for the front cable disc brake illustrated in FIGS. 2 and 4–6;

FIG. 21 is a side elevational view of one of the brake pads for the front cable disc brake illustrated FIGS. 2 and 4–6;

FIG. 22 is an edge elevational view of the brake pad illustrated in FIG. 21 for the front cable disc break illustrated in FIGS. 2 and 4–6;

FIG. 23 is a side elevational view of the pad axle for the front cable disc brake illustrated in FIGS. 2 and 4–6;

FIG. 24 is an end elevational view of the pad axle illustrated in FIG. 23 for the front cable disc brake illustrated in FIGS. 2 and 4–6;

DETAILED DESCRIPTION OF THE PREFERRED EMBODIMENTS

Figure 1:
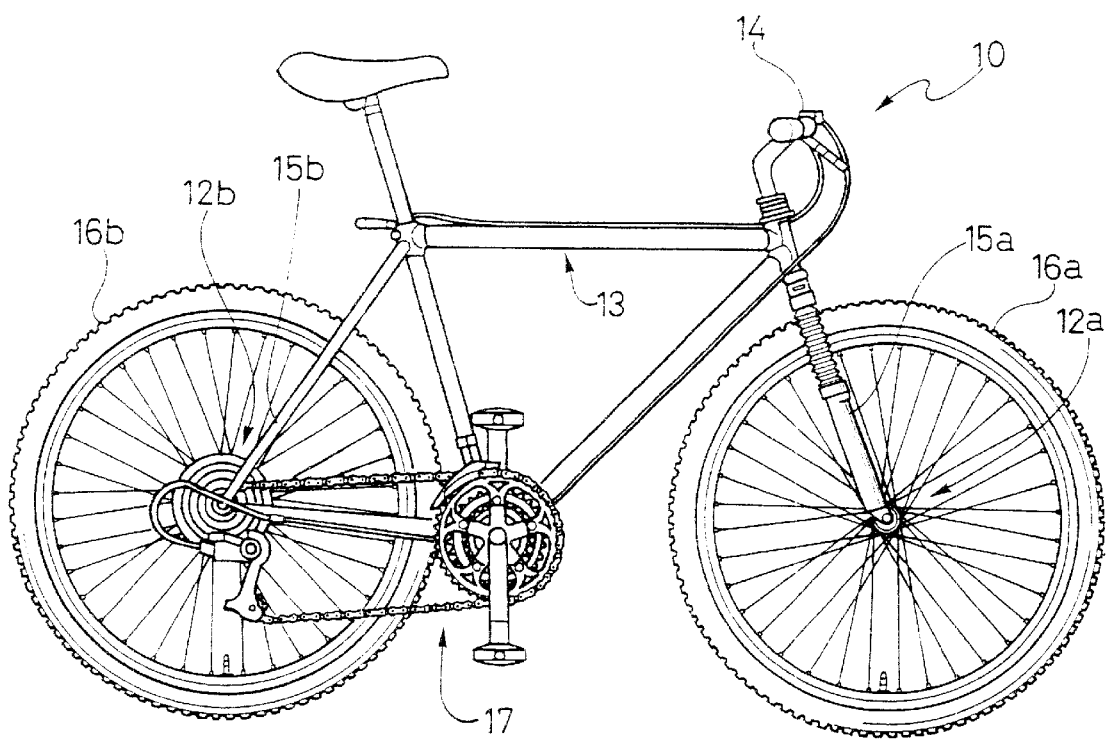
FIG. 1 is a side elevational view of a bicycle with a pair of cable disc brakes coupled thereto in accordance with one embodiment of the present invention.
Figure 2:
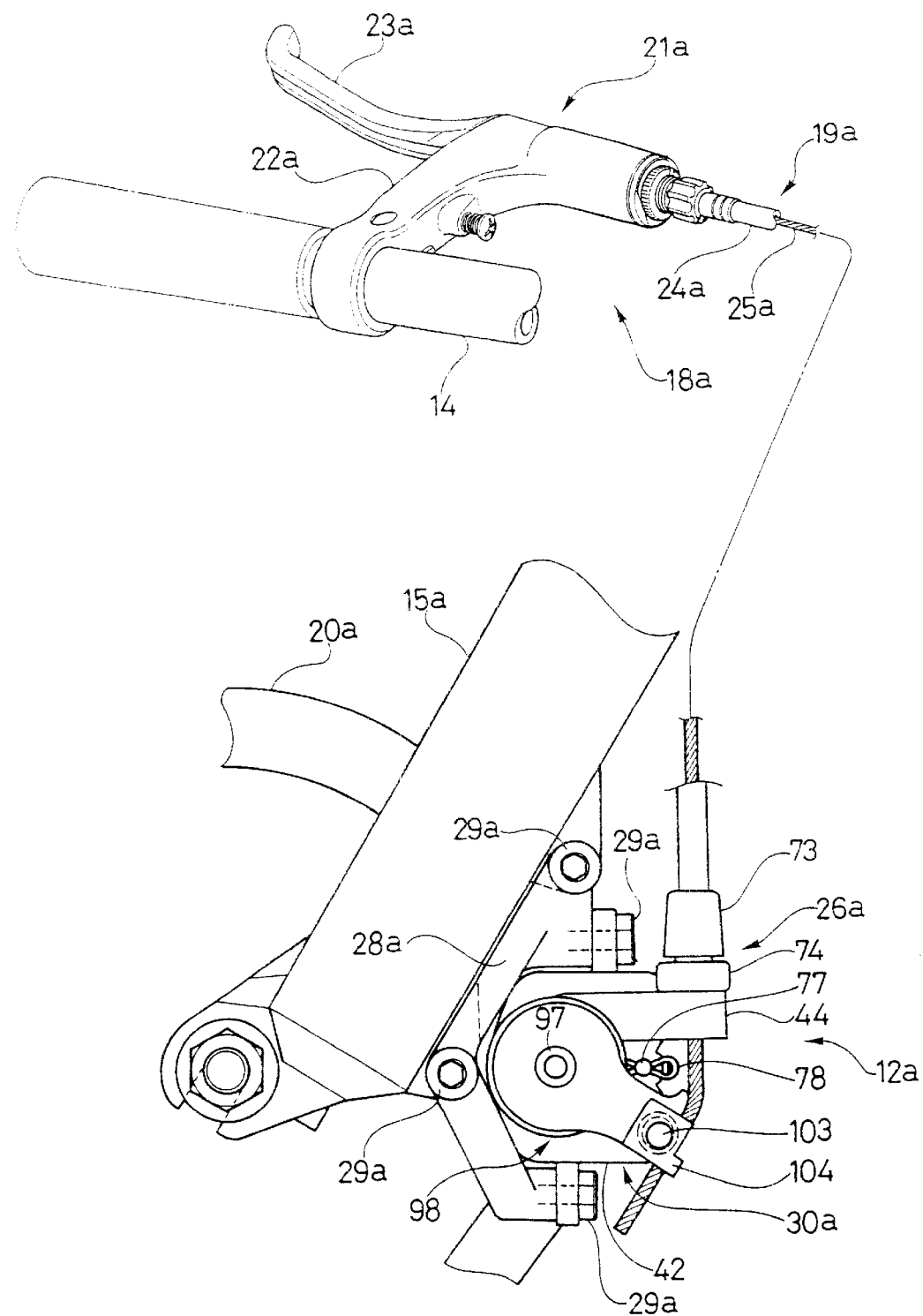
FIG. 2 is a side elevational view of a front portion of a bicycle with a front cable disc brake coupled thereto in accordance with one embodiment of the present invention.
Figure 3:
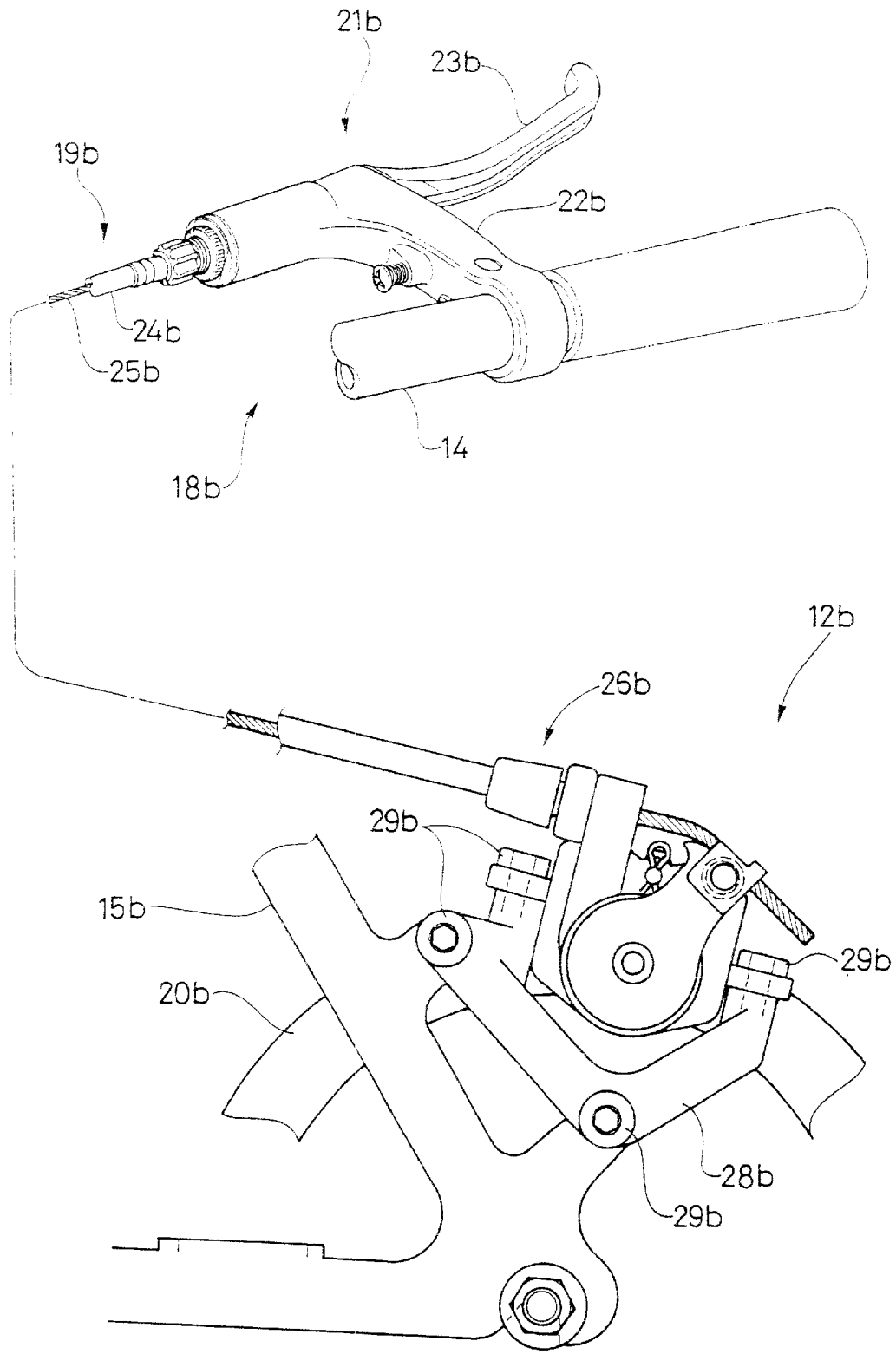
FIG. 3 is a side elevational view of a rear portion of a bicycle with a rear cable disc brake coupled thereto in accordance with one embodiment of the present invention.

Referring initially to FIGS. 1–3, front and rear portions of a bicycle 10 are illustrated with a pair of cable disc brakes 12a and 12b coupled thereto in accordance with one embodiment of the present invention. Bicycles such as bicycle 10 are well known in the art, and thus, bicycle 10 and its various components will not be discussed or illustrated in detail herein. It will be apparent to those skilled in the art that bicycle 10 can be any type of bicycle, e.g., mountain bike, a hybrid bike or a road bike. Bicycle 10 is a conventional bicycle, which basically includes a bicycle frame 13 with a handlebar 14 front and rear forks 15a and 15b, front and rear wheels 16a and 16b and a drive train 17.

As seen in FIGS. 2 and 3, the front and rear cable disc brakes 12a and 12b are identical to each other, except for their connections to the bicycle 10 and their respective brake operating mechanisms 18a and 18b. Specifically, the front cable disc brake 12a is mounted to the front fork 15a and operatively coupled to the front brake operating mechanism 18a via a front brake cable 19a. The rear cable disc brake 12b, on the other hand, is coupled to the rear fork 15b and the rear brake operating mechanism 18b via a rear brake cable 19b. The front and rear brake operating mechanisms 18a and 18b are well known in the art, and thus, they will not be discussed or illustrated in detail herein.

Basically, the front brake operating mechanism 18a is designed to actuate the front disc brake 12a to stop rotation of front wheel 16a. More specifically, the front brake operating mechanism 18a is operatively coupled to the front disc brake 12a by front brake cable 19a to apply a forcible gripping action on a front disc brake rotor 20a that is fixedly coupled to the front wheel 16a. Likewise, the rear brake operating mechanism 18b is designed to actuate the rear disc brake 12b to stop rotation of rear wheel 16b. More specifically, the rear brake operating mechanism 18b operatively coupled to the rear disc brake 12b by rear brake cable 19b to apply a forcible gripping action on a rear disc brake rotor 20b that is fixedly coupled to the rear wheel 16b.

Preferably, the brake operating mechanisms 18a and 18b are mounted on handlebar 14. In particular, as seen in FIG. 2, the brake operating mechanism 18a has a brake lever 21a that includes a mounting portion 22a and a lever portion 23a. Mounting portion 22a is designed to be clamped onto handlebar 14 in a conventional manner. Lever portion 23a is pivotally coupled to mounting portion 22a for movement between a release position and a braking position. Normally, the lever portion 23a is maintained in a release position in a conventional manner, e.g. by a return spring (not shown). Likewise, as seen in FIG. 3, the rear brake operating mechanism 18b has a brake lever 21b that includes a mounting portion 22b and a lever portion 23b. Mounting portion 22b is designed to be clamped onto handlebar 14 in a conventional manner. Lever portion 23b is pivotally coupled to mounting portion 22b for movement between a release position and a braking position. Normally, the lever portion 23b is maintained in a release position in a conventional manner, e.g. by a return spring (not shown).

The front and rear brake cables 19a and 19b are well known in the art, and thus, they will not be discussed or illustrated in detail herein. Basically, the front brake cable 19a has an outer casing 24a and an inner wire 25a. The outer casing 24a extends between the mounting portion 22a of the brake lever 21a and an adjusting unit 26a that is mounted on the front cable disc brake 12a. The inner wire 25a is fixedly coupled to the lever portion 23a of the brake lever 21a and a portion of the front cable disc brake 12a as discussed below. Similarly, the rear brake cable 19b has an outer casing 24b and an inner wire 25b. The outer casing 24b extends between the mounting portion 22b of the brake lever 21b and an adjusting unit 26b that is mounted on the rear cable disc brake 12b. The inner wire 25b is fixedly coupled to the lever portion 23b of the brake lever 21b and a portion of the rear cable disc brake 12b in the same manner as in the front cable disc brake 12a discussed below.

Still referring to FIGS. 2 and 3, the front cable disc brake 12a is coupled to the front fork 15a via a mounting bracket 28a and four bolts 29a. Similarly, the rear cable disc brake 12b is coupled to the rear fork 15b via a mounting bracket 28b and four bolts 29b. Of course, it will be apparent to those skilled in the art from this disclosure that various other types of mounting mechanisms or assemblies can be utilized as needed and/or desired. Since cable brake discs 12a and 12b are identical to each other, only cable disc brake 12a will be discussed and illustrated in detail herein.

Figure 5:
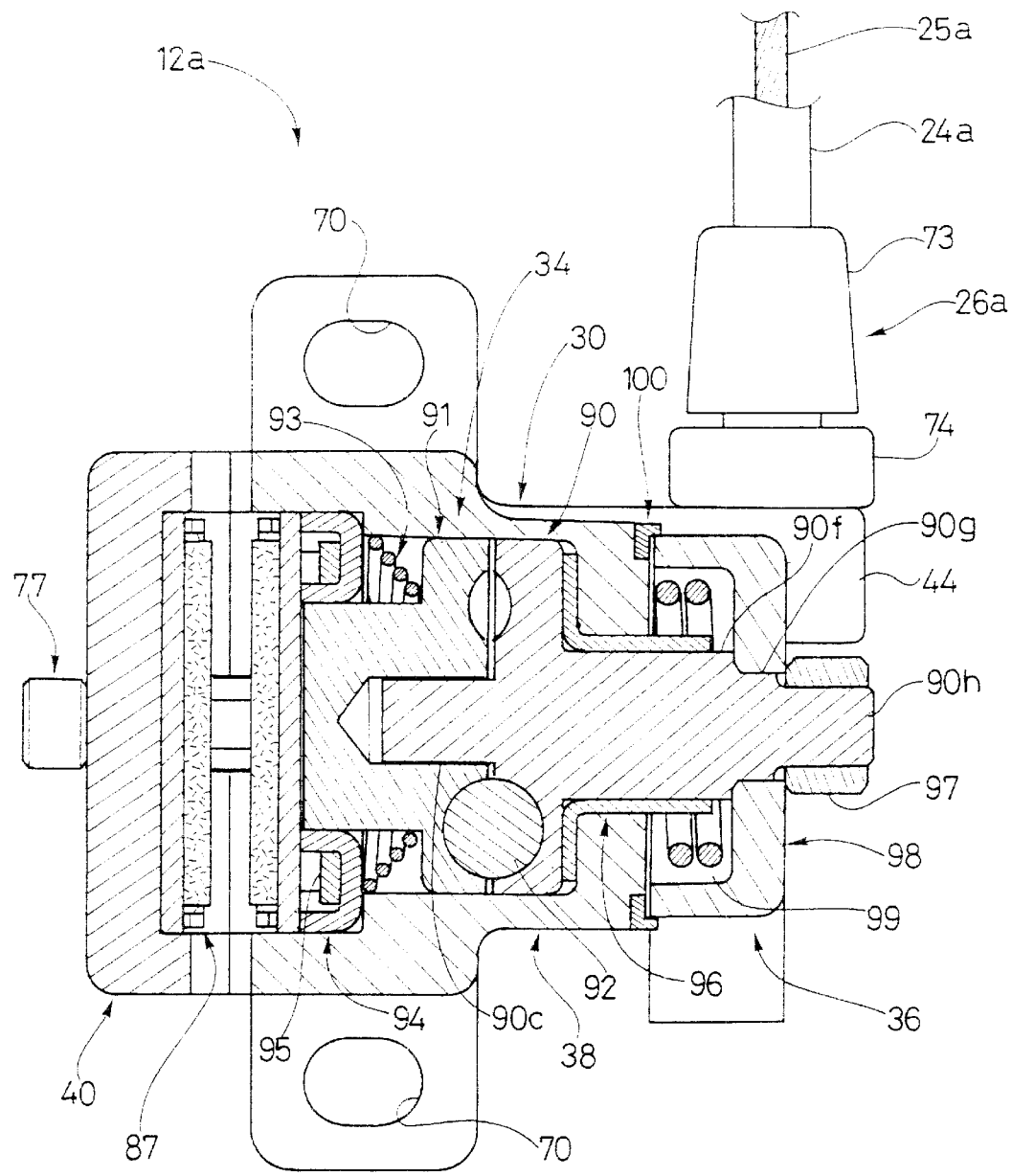
FIG. 5 is a longitudinal cross-sectional view of the front cable disc brake, as viewed along section lines 5—5 of FIG. 4.
Figure 6:
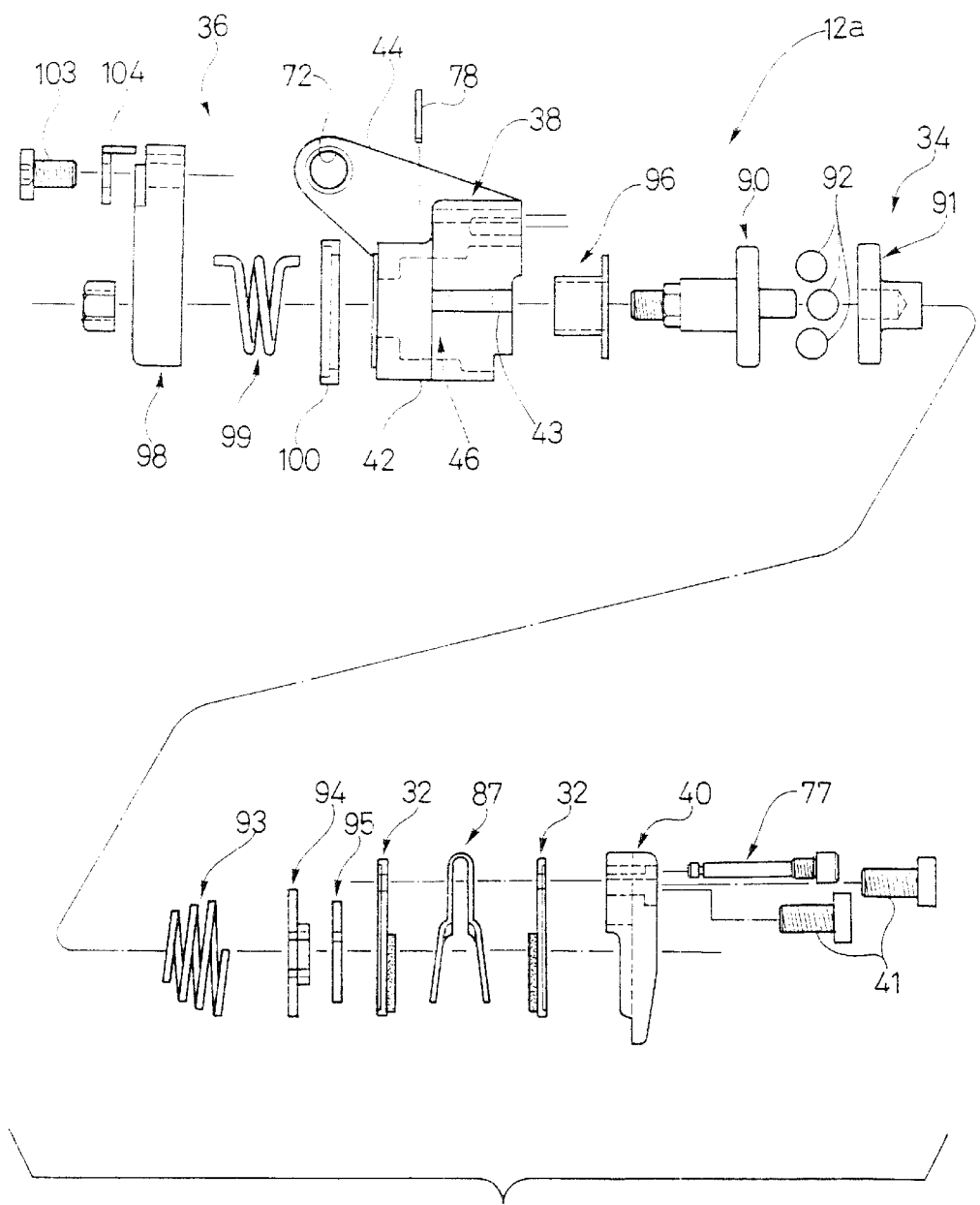
FIG. 6 is an exploded elevational view of the front cable disc brake illustrated in FIGS. 2, 4 and 5.
Figure 7:
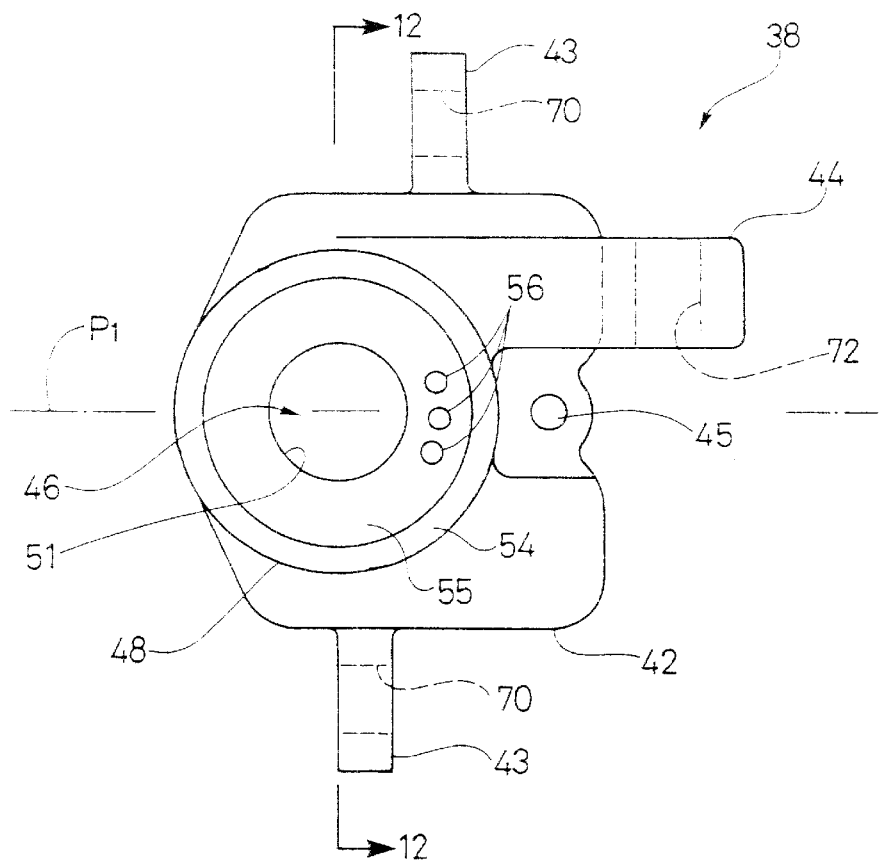
FIG. 7 is a front elevational view of a left caliper portion of the front cable disc brake illustrated in FIGS. 2 and 4–6.
Figure 8:
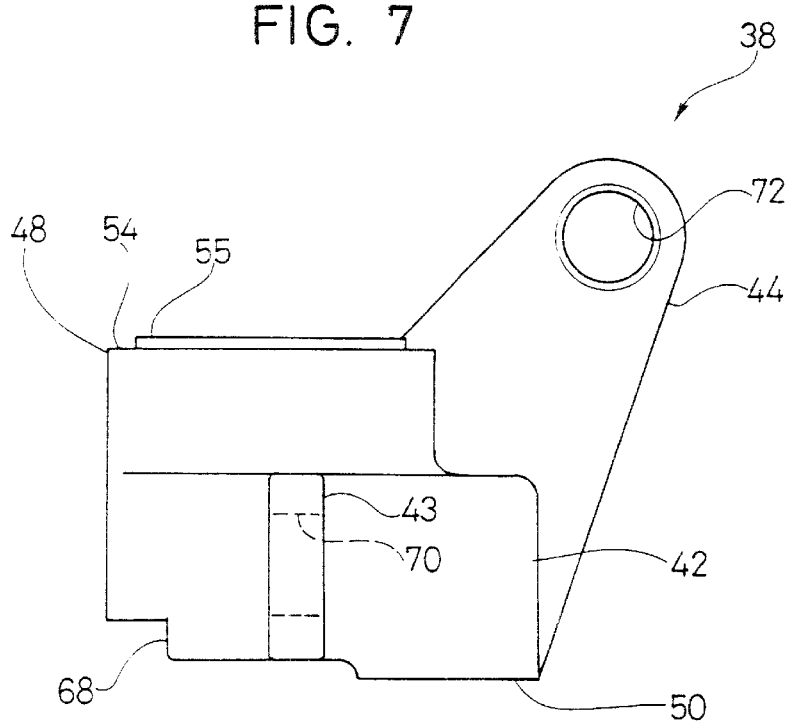
FIG. 8 is a bottom plan view of the left caliper portion of the front cable disc brake illustrated in FIGS. 2 and 4–6.
Figure 9:
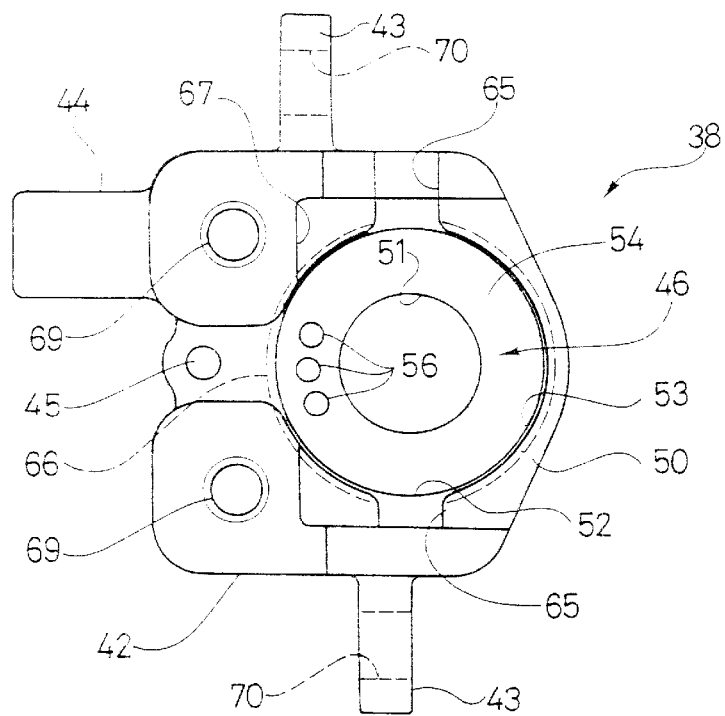
FIG. 9 is a rear elevational view of the left caliper portion illustrated in FIGS. 7 and 8 for the front cable disc brake illustrated in FIGS. 2 and 4–6.
Figure 10:
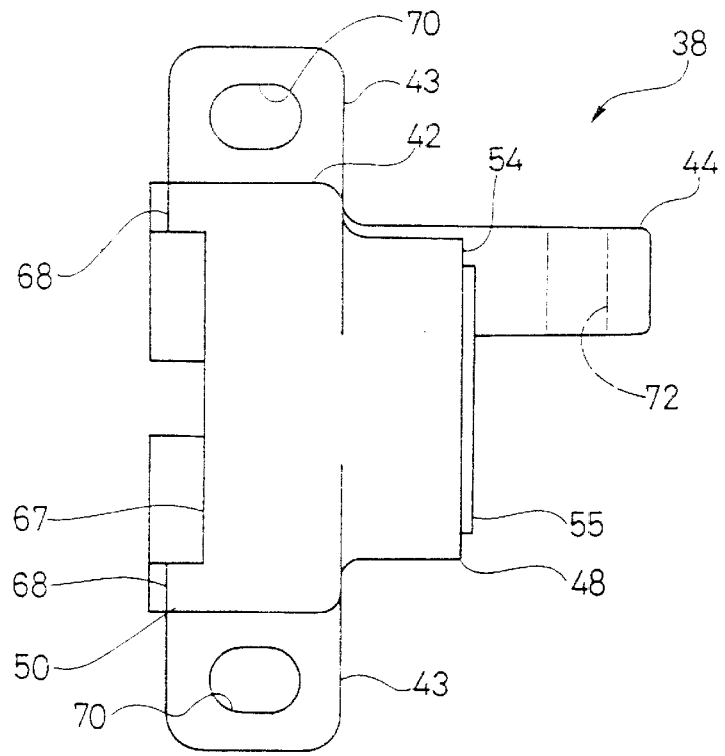
FIG. 10 is a left side elevational view of the left caliper portion illustrated in FIGS. 7–9 for the front cable disc brake illustrated in FIGS. 2 and 4–6.
Figure 11:
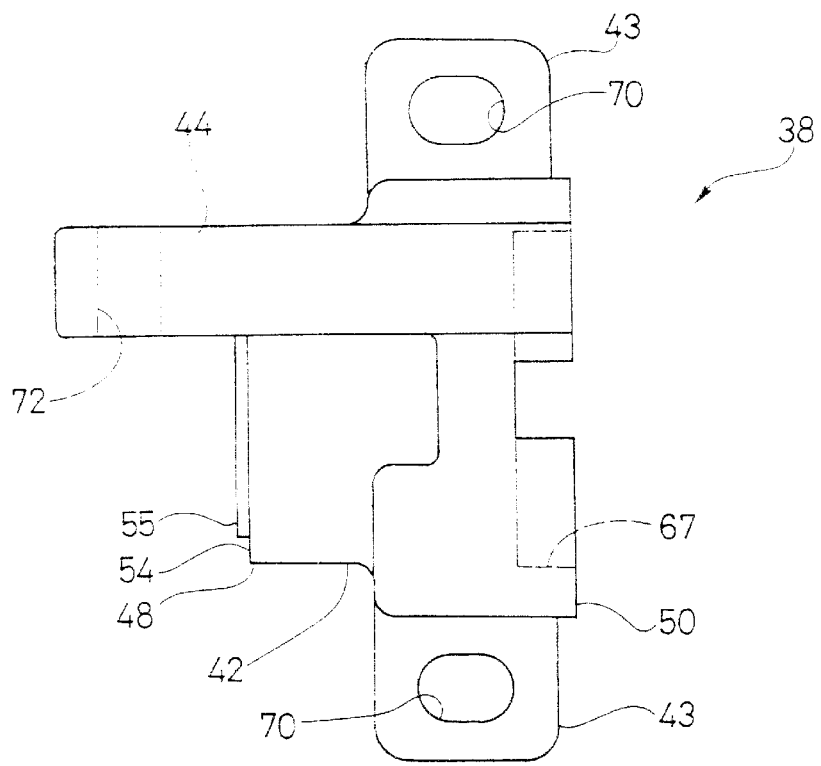
FIG. 11 is a right side elevational view of the left caliper portion illustrated in FIGS. 7–10 for the front cable disc brake illustrated in FIGS. 2 and 4–6.
Figure 12:
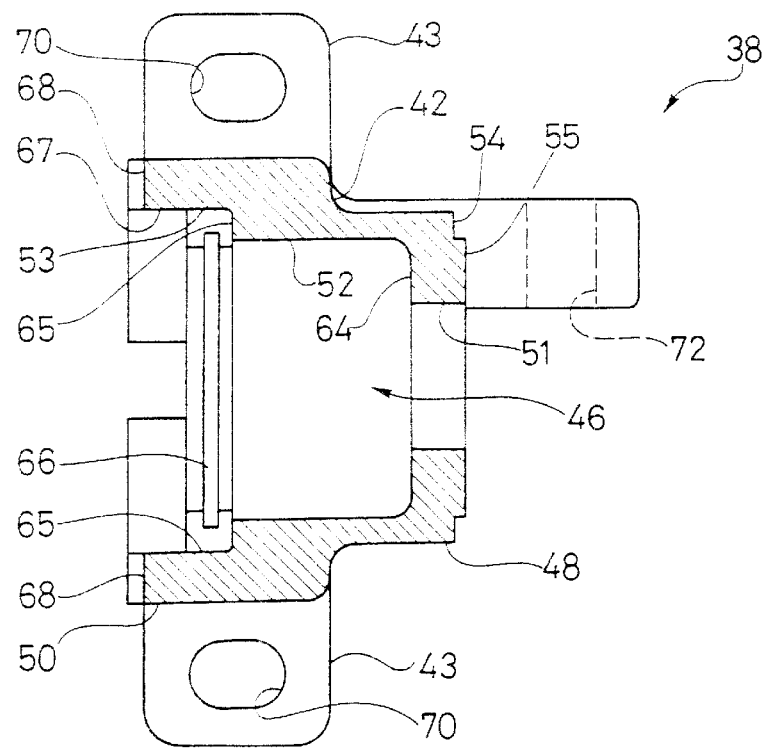
FIG. 12 is a cross-sectional view of the front left caliper portion illustrated in FIGS. 7–11, as viewed along section lines 12—12 of FIG. 7.

Basically, as seen in FIGS. 5 and 6, the cable disc brake 12a includes a caliper housing 30, a pair of brake pads or friction members 32, a cam assembly 34 and an actuating assembly 36. The cam assembly 34 and the actuating assembly 36 together form a cable actuated mechanism that moves the brake pads between a release position and a braking position. The caliper housing 30 is mounted to the frame 13 of the bicycle 10 via the bracket 28a and bolts 29a. The brake pads 32 are movably coupled to the caliper housing 30 to move between the release position and the braking position via the cam assembly 34 and the actuating assembly 36 (cable actuated mechanism). In the release position, the pads 32 are spaced from the disc brake rotor 20a to allow free rotation thereof. In the braking position, the brake pads 32 are pressed against the sides of the disc brake rotor 20a to stop rotation of the bicycle wheel 16a and the disc brake rotor 20a.

Figure 4:
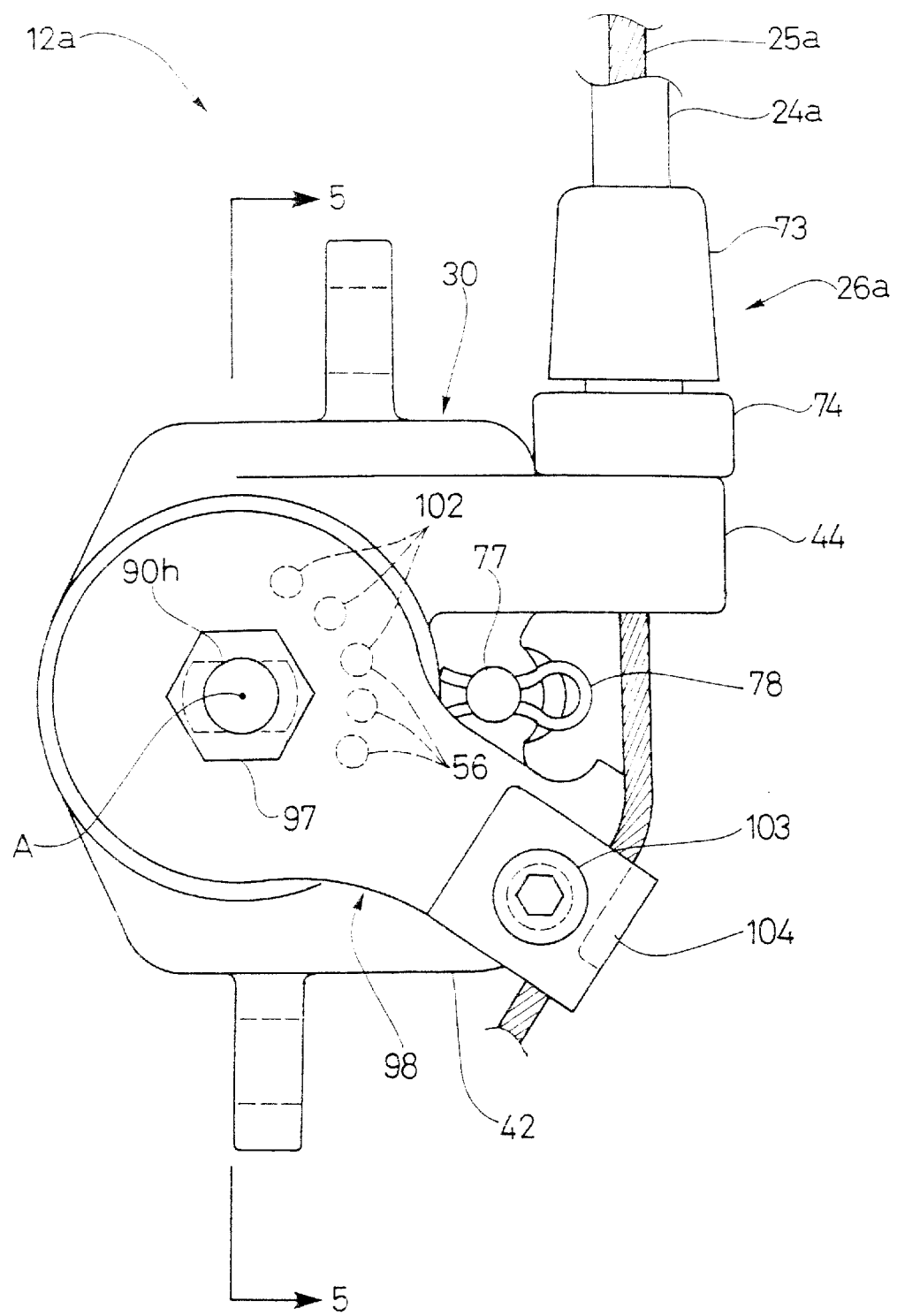
FIG. 4 is an enlarged, partial side elevational view of the front cable disc brake in accordance with the embodiment of the present invention illustrated in FIG. 2.

Turning to FIGS. 4–6, the caliper housing 30 basically includes a left caliper portion 38 and a right caliper portion 40 that are fixedly coupled together by a pair of bolts 41. When the left and right caliper housings 38 and 40 are coupled together, an internal cavity is formed for movably supporting the brake pads 32 and the cam assembly 34, as discussed below. The left and right caliper housings 38 and 40 are preferably constructed of a hard, rigid material, such as a metallic material. Of course, other suitable materials can be utilized for the left and right caliper housings 38 and 40.

As seen in FIGS. 7–12, the left caliper portion 38 basically has a body portion 42 a pair of mounting flanges 43 and a cable support flange 44. The body portion 42 has a pad support bore 45 extending in a longitudinal direction and an axially extending internal bore 46 that extends longitudinally between a first open end 48 and a second open end 50 of the left caliper portion 38. The pad support bore 45 is utilized to support the brake pads 32 on the caliper housing 30 as discussed below.

Basically, the internal bore 46 can be divided into three sections 51, 52 and 53 for supporting a part of the cam assembly 34, as discussed below. The first section 51 of the internal bore 46 is a cylindrical bore with the smallest diameter. The first section 51 of the internal bore 46 is located at a first end 48 of the left caliper portion 38. The first end 48 of the left caliper portion 38 has the actuating assembly 36 coupled thereto, as discussed below. Preferably, end surface of the first end 48 of the left caliper portion 38 has an annular step to form a pair of annular end surfaces 54 and 55 that lie in different planes. The inner end surface 55 adjacent the first section 51 of the internal bore 46 is preferably provided with three through bores 56 that are adapted to receive a part of the actuating assembly 36, as discussed below. Preferably, the centers of these bores 56 are spaced approximately twenty degrees apart in a circumferential direction. These bores 56 allow for adjustment of the actuating assembly 36, as discussed below. The middle one of the bores 56 is preferably spaced approximately four degrees in a circumferential direction from the center plane $P_1$ of the disc brake device 12a.

The second section 52 of the internal bore 46 is also a cylindrical bore that is located between the first section 51 and the third section 53. The second section 52 of the internal bore 46 has a larger diameter than the first section 51 of the internal bore 46. Thus, an internal abutment surface or end wall 64 is formed radially between the first and second sections 51 and 52 of the internal bore 46.

The third section 53 of the internal bore 46 is also cylindrical, but is a discontinuous cylinder. Specifically, the third section 53 of the internal bore 46 has a pair of longitudinal slots 65 and an annular groove 66 formed therein. The slots 65 that are spaced 180° apart and divide the annular groove 66 into two sections.

The second end 50 of the left caliper portion 38 is provided with a pair of threaded bores 69 for receiving the bolts 41 to secure the left and right caliper housings 38 and 40 together. The second end 50 of the left caliper portion 38 has a brake pad mounting recess 67 that is substantially identical to the outer periphery of the brake pads 32. The bottom of the brake pad mounting recess 67 is open and the sides of the second end 50 of the caliper housing 38 has a pair of cutouts 68 for accommodating a portion of the disc brake rotor 20a therein.

The mounting flanges 43 of the left caliper portion 38 preferably have slots 70 to allow axial adjustment to and from the disc brake rotor 20a. The slots 70 receive the mounting bolts 29a therethrough to fasten the left caliper portion 38 to the front bracket 28a.

Figure 13:
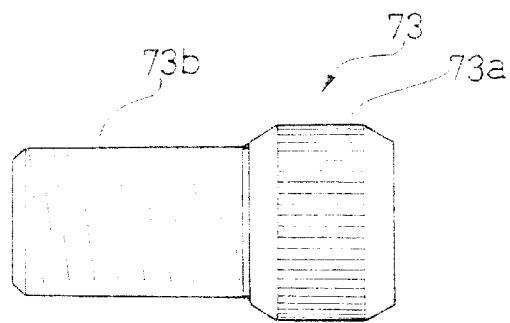
FIG. 13 is a side elevational view of the cable adjusting bolt for the adjusting unit of the front cable disc brake illustrated in FIGS. 2 and 4–5.
Figure 14:
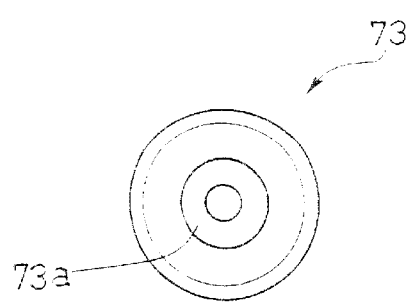
FIG. 14 is an end elevational view of the cable adjusting bolt illustrated in FIG. 13 for the cable adjusting unit of the front cable disc brake illustrated in FIGS. 2 and 4–6.
Figure 15:
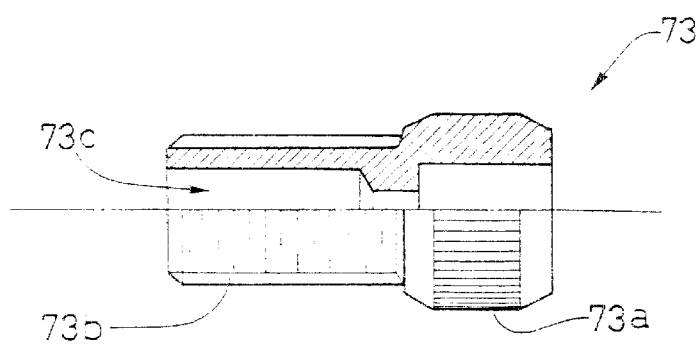
FIG. 15 is a partial, longitudinal cross-sectional view of the cable adjusting bolt illustrated in FIGS. 13 and 14 for the cable adjusting unit of the front cable disc brake illustrated in FIGS. 2 and 4–6.

As seen in FIGS. 2, 4, 7 and 8, the cable support member or flange 44 extends outwardly from the body portion 42 in a direction that is substantially tangent to an imaginary circle with its center located at the center axis of the internal bore 46. The free end of the cable support flange 44 has a threaded hole 72 therein for receiving a cable adjusting bolt 73 of the cable adjusting unit 26a as seen in FIGS. 2 and 4. The cable adjusting unit 26a adjusts the relative tension between the outer casing 24a and the inner wire 25a. Specifically, as seen in FIGS. 13–15, the cable adjusting bolt 73 has a head portion 73a and a threaded shaft portion 73b with an axially extending bore 73c extending through both the head portion 73a and the threaded shaft portion 73b. The bore 73c is step-shaped for accommodating outer casing 24a and inner wire 25a in a conventional manner. The head portion 73a is a tubular member with a textured outer surface.

Figure 16:
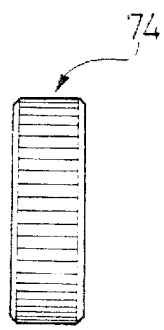
FIG. 16 is a side elevational view of the cable adjusting nut for the cable adjusting unit of the front cable disc brake illustrated in FIGS. 2 and 4–5.
Figure 17:
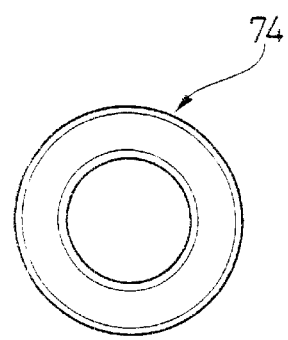
FIG. 17 is an end elevational view of the cable adjusting nut for the cable adjusting unit of the front cable disc brake illustrated in FIGS. 2 and 4–6.
Figure 25:
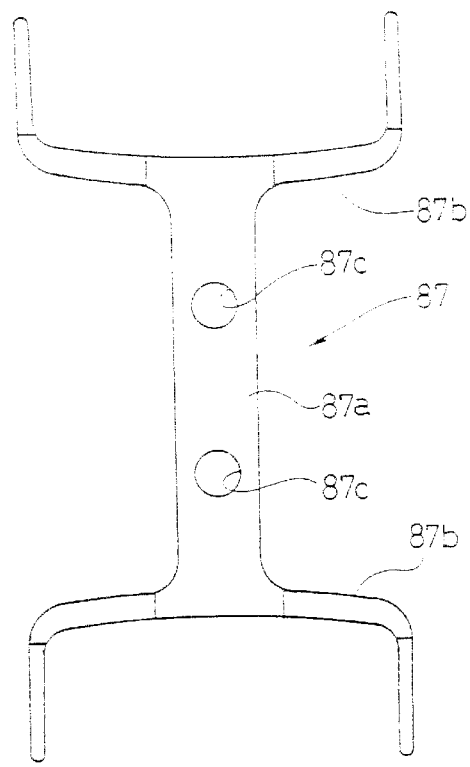
FIG. 25 is an elevational view of the pad spring prior to bending for the front cable disc brake illustrated FIGS. 2 and 4–6.
Figure 26:
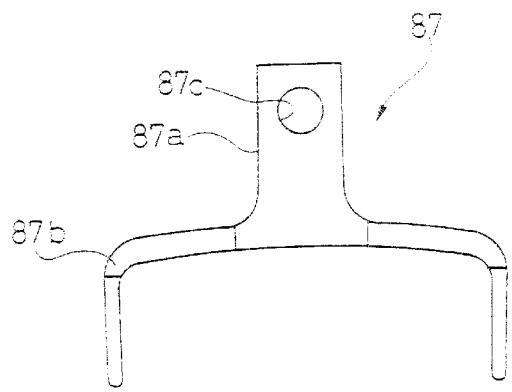
FIG. 26 is a side elevational view of the pad spring illustrated in FIG. 25 for the front cable disc brake illustrated in FIGS. 2 and 4–6.
Figure 27:
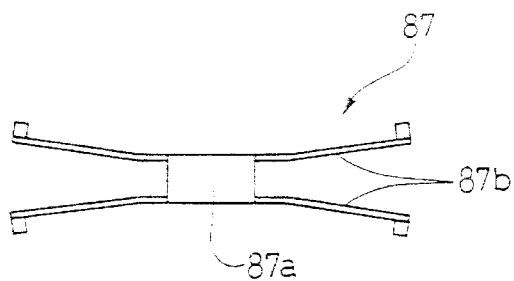
FIG. 27 is a top plan view of the pad spring illustrated in FIGS. 25 and 26 for the front cable disc brake illustrated in FIGS. 2 and 4–6.
Figure 28:
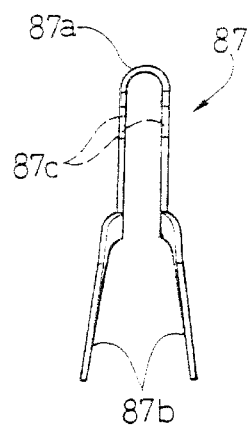
FIG. 28 is an end elevational view of the pad spring illustrated in FIGS. 25–27 for the front cable disc brake illustrated in FIGS. 2 and 4–6.
Figure 29:
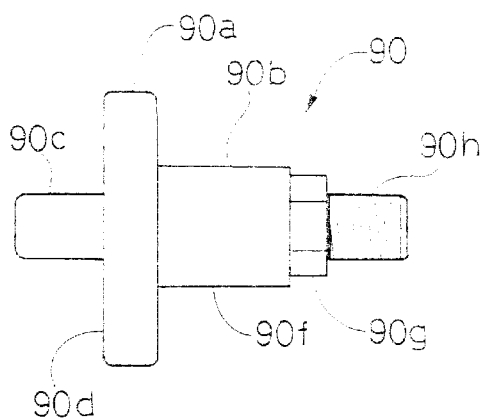
FIG. 29 is a side elevational view of the input cam for the front cable disc brake illustrated in FIGS. 2 and 4–6.
Figure 30:
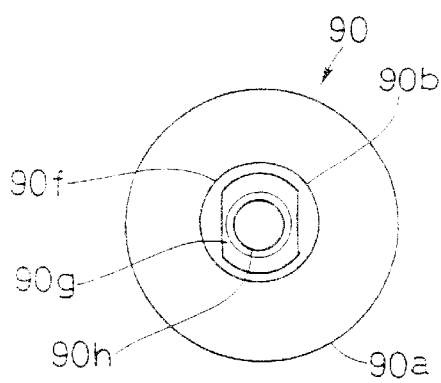
FIG. 30 is an end elevational view of the input cam illustrated in FIG. 29 for the front cable disc brake illustrated in FIGS. 2 and 4–6.
Figure 31:
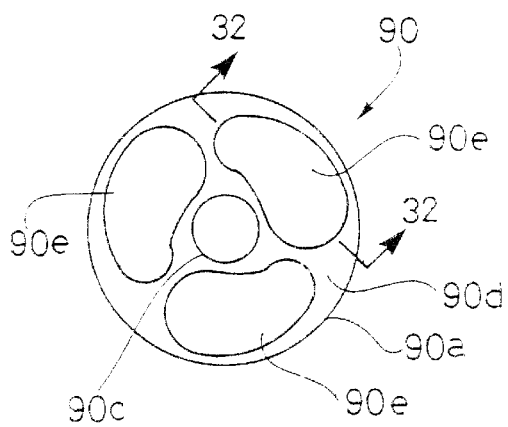
FIG. 31 is an end elevational view of the input cam illustrated in FIGS. 29 and 30 for the front cable disc brake illustrated in FIGS. 2 and 4–6.
Figure 32:
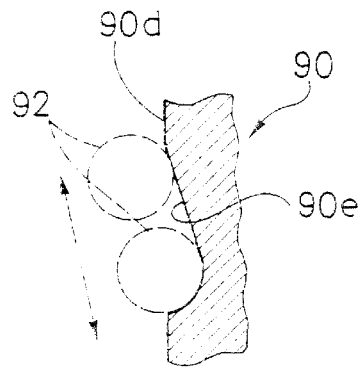
FIG. 32 is a partial, cross-sectional view of the input cam illustrated in FIGS. 29–31 as viewed along section lines 32—32 of FIG. 31.
Figure 33:
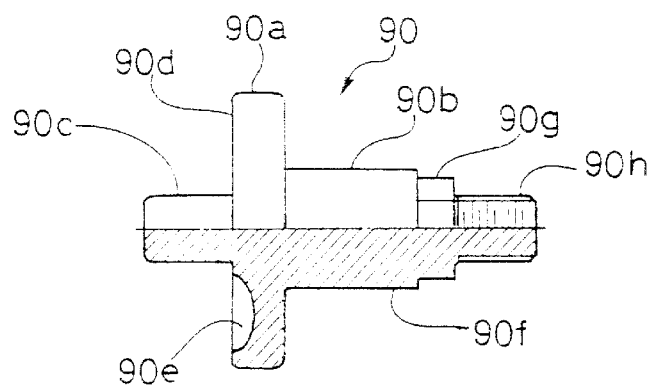
FIG. 33 is a partial, longitudinal cross-sectional view of the input cam illustrated in FIGS. 29–32 for the front cable disc brake illustrated in FIGS. 2 and 4–6.

The threaded shaft portion 73b has threads on its outer surface that threadedly engaged the internal threads of the threaded hole 72. Accordingly, rotation of the cable adjusting bolt 73 causes the cable adjusting bolt 73 to move axially relative to the cable support flange 44. As seen in FIGS. 2 and 4, the cable adjusting bolt 73 has a cable adjusting nut 74 located on the threaded shaft portion 73b. The cable adjusting bolt 73 (FIGS. 13–15) and the cable adjusting nut 74 (FIGS. 16 and 17) form the cable adjusting unit 26a for controlling the tension within the brake cable 19a.

Turning now to FIGS. 6 and 18–20, the right caliper portion 40 is fixedly coupled to the second end 50 of the left caliper portion 38 by the bolts 41. The right caliper portion 40 substantially closes off the open end of the second end 50 of the left caliper portion 38, except for a slot for accommodating the disc brake rotor 20a. Accordingly, the right caliper portion 40 has a pair of through bores 75 for receiving the bolts 41 therein. Preferably, these through bores 75 are step-shaped so that the heads of the bolts 75 are recessed from the outer surface of the right caliper portion 40.

Also, the right caliper portion 40 has a threaded bore 76 for receiving the pad axle 77 therein. Preferably, as seen in FIGS. 23 and 24, the pad axle 77 is a threaded bolt having a head portion 77a and a shaft portion 77b extending outwardly from the head portion 77a. The section of the shaft portion 77b adjacent the head portion 77a is provided with threads 77c that threadedly engage the threaded bore 76 of the right caliper portion 40. The free end of the shaft portion 77b is preferably provided with an annular recess 77d for receiving a retaining clip 78.

The inner surface of the right caliper portion 40 has a brake pad mounting recess 80 that has the shape of the periphery of the brake pad 32, such that the right brake pad 32 is securely retained against the inner surface of the right caliper portion 40. This brake pad mounting recess 80 should be sized and shaped such that the right brake pad 32 does not rotate or move. The side edges of the right caliper portion 40 has a pair of cutout portions 82 for forming a half of the disc brake rotor slot.

As seen in FIGS. 5 and 6, the left and right brake pads 32 are substantially identical to each other and can preferably be interchanged with each other. As seen in FIGS. 21 and 22, the right and left brake pads 32 each include a rigid support plate 83 and an arcuate portion of friction material 84 attached to the support plate 83 for engaging the brake rotor 20a. The rigid support plate 83 having a mounting tab 85 with a bore 86 therein for receiving the pad axle 77 (FIGS. 6, 23 and 24) therethrough. When the brake pads 32 are mounted on the pad axle 77, the brake pads 32 can move axially on the pad axle 77, but cannot rotate due to the structure of the brake pad mounting recesses 67 and 80 of the left and right caliper housings 38 and 40.

As seen in FIGS. 6 and 25–28, a pad spring 87 is provided between the left and right brake pads 32 to bias them apart. The pad spring 87 is preferably constructed of a thin resilient material, such as a spring steel. The pad spring 87 has a central connecting portion 87a and a pair of biasing portions 87b extending outwardly from opposite ends of the connecting portion 87a. The connecting portion 87a is preferably an inverted U-shaped member with a pair of axially aligned holes 87c that receive the pad axle 77. The biasing portions 87b are also inverted U-shaped members that diverge outwardly to their free ends relative to a center line bisecting the connecting portion 87a.

Turning again to FIGS. 5 and 6, the cam assembly 34 basically includes an input cam 90, an output cam 91, a set of rolling members 92, a return spring 93, an output cam rotation stopper 94, a retainer 95 and a bushing 96. Basically, the cam assembly 34 is located in the internal bore 46 of the left caliper portion 38 and is adapted to expand in an axial direction by movement of the actuating assembly 36 via the brake operating mechanism 18a. In particular, rotation of the input cam 90 by the actuating assembly 36 causes the output cam 91 to move in an axial direction against the force of the return spring 93 and the pad spring 87 to compress the left and right brake pads 32 together against the disc brake rotor 20a.

As seen in FIGS. 29–33, the input cam 90 has a cam member 90a with an operating shaft 90b extending from one end and a guide pin 90c extending outwardly from the other end. The cam member 90a has an axially facing camming surface 90d with three camming slots 90e that receive the three roller members 92 (balls). These camming slots 90e are preferably arcuate slots that curve about the center rotational axis of the input cam 90. These camming slots 90e are ramp-shaped and have an angled bottom surface that is preferably sloped approximately 17° relative to a plane passing perpendicularly through the axis of rotation of the input cam 90. Accordingly, when the input cam 90 is rotated, the rolling members 92 will move in a circumferential direction within the camming slots 90e, such that all of the rolling members 92 are located at the same position within the camming slots 90e to axially move the output cam 91.

The operating shaft 90b is preferably a step-shaped shaft having a first cylindrical section 90f, a second non-cylindrical section 90g and a third cylindrical section 90h. The first cylindrical section 90f is sized to be received in the first section 51 of the internal bore 46 of the left caliper portion 38. Preferably, the bushing 96 is located around the first cylindrical section 90f as seen in FIG. 5. The second non-cylindrical section 90g of the operating shaft 90b is adapted to non-rotatably support a portion of the actuating assembly 36, as discussed below. The third cylindrical section 90h of the operating shaft 90b is preferably threaded for receiving a nut 97 to secure the actuating assembly 36 thereto.

The guide pin 90c is preferably a short pin that is located on the longitudinal axis of the input cam 90 and engages the output cam 91 to ensure smooth movement of the output cam 91 relative to the input cam 90.

Referring now to FIGS. 34–38, the output cam 91 basically includes a camming member 91a and a thrust shaft 91b. The camming member 91a is preferably a cylindrical member having a camming surface 91c facing the camming surface 90d of the input cam 90. The camming surface 91c is preferably provided with three camming slots 91d that are substantially identical to the camming slots 90e of the input cam 90 and are adapted to engage the rolling members 92 to move the output cam 91 axially in response to rotational movement of the input cam 90.

Figure 34:
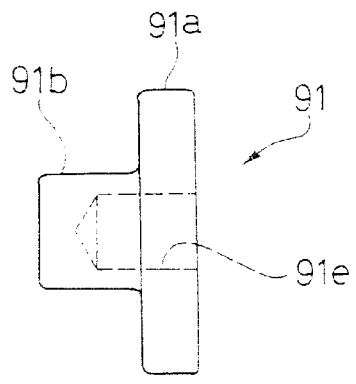
FIG. 34 is a side elevational view of the output cam for the front cable disc brake illustrated in FIGS. 2 and 4–6.
Figure 35:
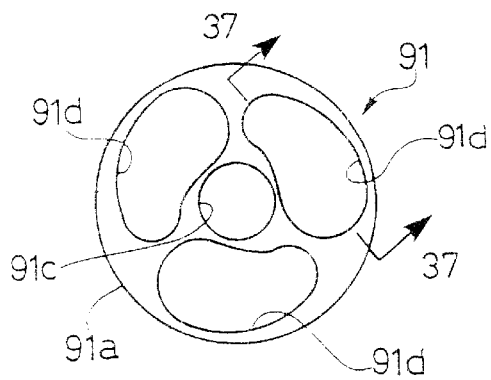
FIG. 35 is an end elevational view of the output cam illustrated in FIG. 34 for the front cable disc brake illustrated in FIGS. 2 and 4–6.
Figure 36:
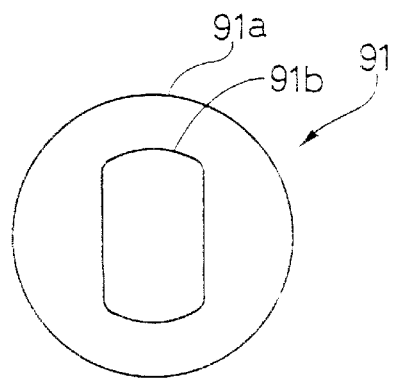
FIG. 36 is an end elevational view of the output cam illustrated in FIGS. 34 and 35 for the front disc brake illustrated in FIGS. 2 and 4–6.
Figure 37:
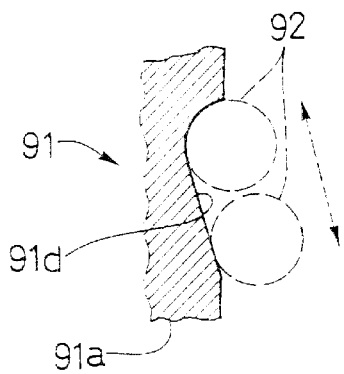
FIG. 37 is a partial cross-sectional view of the output cam illustrated in FIGS. 34–36 as viewed along section lines 37—37 of FIG. 35.
Figure 38:
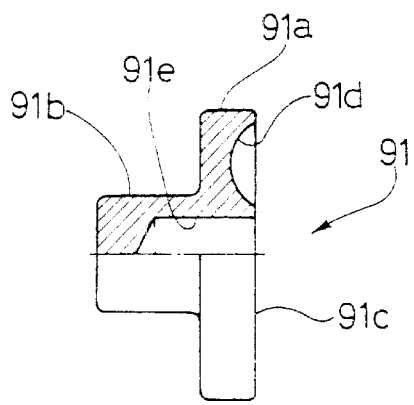
FIG. 38 is a partial, longitudinal cross-sectional view of the output cam illustrated in FIGS. 34–37 for the front cable disc brake illustrated in FIGS. 2 and 4–6.

As seen in FIGS. 5, 34 and 38, the camming surface 91c of the output cam 91 is also provided with a centrally located blind bore 91e that is adapted to receive the guide pin 90c therein. Preferably, the lengths of the guide pin 90c and the blind bore 91e are such that they do not disengage at any time during the axial movement of the output cam 91 relative to the input cam 90. The thrust shaft 91b of the output cam 91 is preferably a non-circular member that engages the output cam rotation stopper 94, which in turn engages the left caliper portion 38 so that the output cam 91 cannot rotate relative to the left caliper portion 38.

Figures 39, 40:
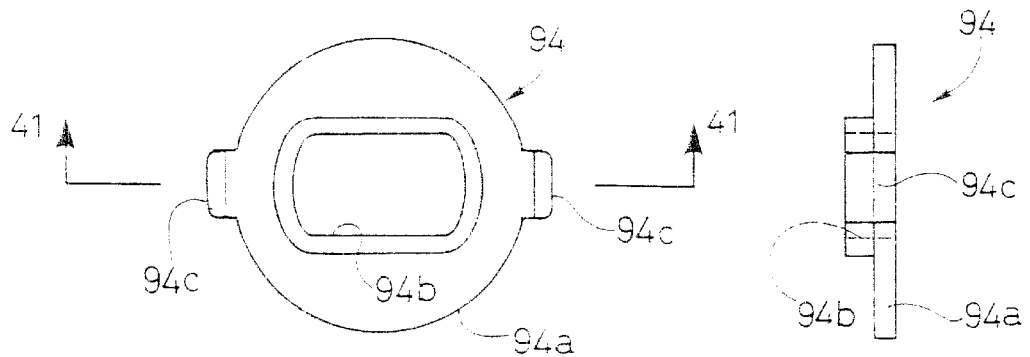
FIG. 39 is an end elevational view of the output cain rotation stopper for the front cable disc brake illustrated in FIGS. 2 and 4–6.
FIG. 40 is a side edge elevational view of the output cam rotation stopper illustrated in FIG. 39 for the front cable disc brake illustrated in FIGS. 2 and 4–6.
Figure 41:
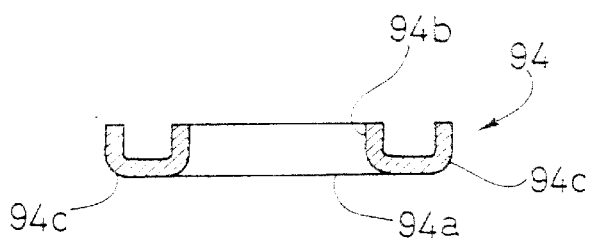
FIG. 41 is a transverse cross-sectional view of the output cam rotation stopper illustrated in FIGS. 39 and 40 for the front cable disc brake illustrated in FIGS. 2 and 4–6, as viewed along section lines 41—41 of FIG. 39.

In particular, the rotation stopper 94, as seen in FIGS. 39–41, has an annular center section 94a with a non-circular hole 94b that is adapted to receive the thrust shaft 91b of the output cam 91 therein such that there is no relative rotation therebetween. A pair of tabs 94c are located 180° apart and extend radially outwardly from the center section 94a of the rotation stopper 94. These tabs 94c are received in the slots 65 of the left caliper portion 38 such that the rotation stopper 94 cannot rotate relative to the left caliper portion 38. Thus, since the rotation stopper 94 cannot rotate, the output cam 91 cannot rotate. The rotation stopper 94 is secured on the thrust shaft 91b of the output cam 91 by the retainer 95. The retainer 95 is preferably a C-shaped snap ring. This C-shaped snap ring or retainer 95 is received in the annular groove 66 formed in the internal bore 46 of the left caliper portion 38.

Figures 42, 43:
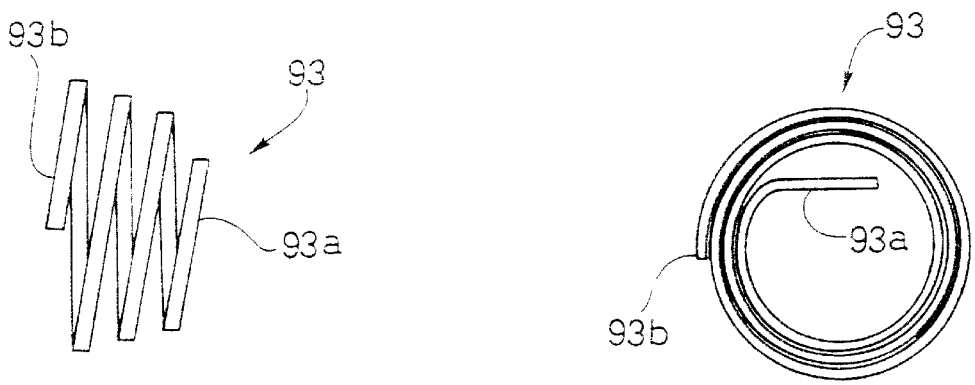
FIG. 42 is an output cam return spring for the front cable disc brake illustrated in FIGS. 2 and 4–6.
FIG. 43 is an end elevational view of the output cam return spring illustrated in FIG. 42 for the front cable disc brake illustrated in FIGS. 2 and 4–6.
Figure 44:
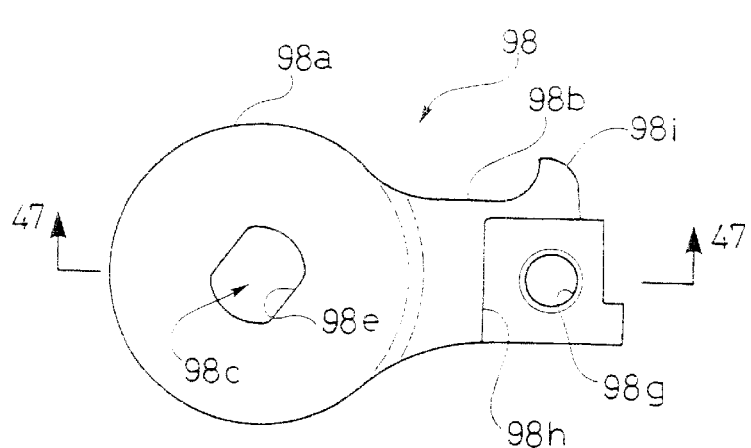
FIG. 44 is an end elevational view of the actuating arm for the front cable disc brake illustrate FIGS. 2 and 4–6.
Figure 45:
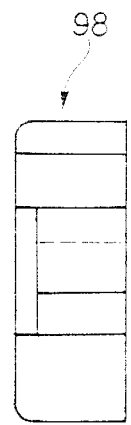
FIG. 45 is a side edge elevational view of the actuating arm illustrated in FIG. 44 for the front cable disc brake illustrated in FIGS. 2 and 4–6.
Figure 46:
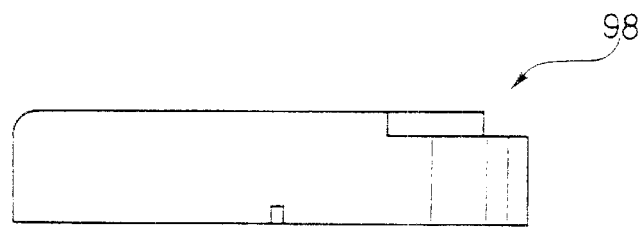
FIG. 46 is a bottom plan view of the actuating arm for the front cable disc brake illustrated in FIGS. 2 and 4–6.
Figure 47:
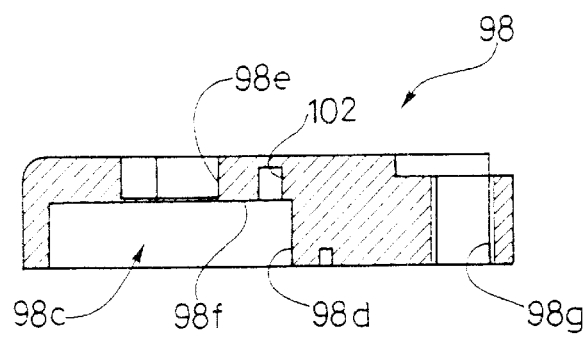
FIG. 47 is a cross-sectional view of the actuating arm illustrated in FIGS. 44–46 for the front cable disc brake illustrated in FIGS. 2 and 4–6, as viewed along section line 47—47 of FIG. 44.
Figure 48:
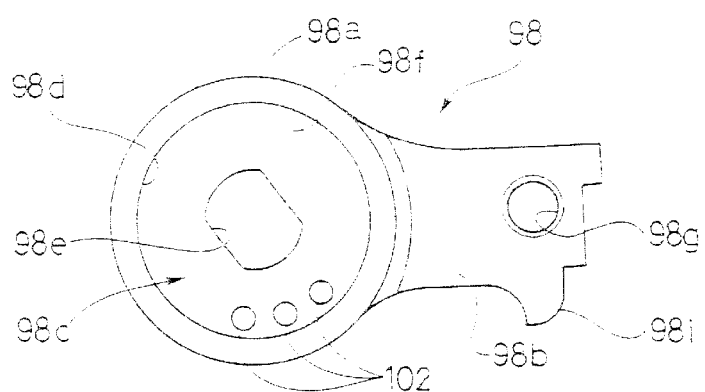
FIG. 48 is an inside end elevational view of the actuating arm illustrated in FIGS. 44–47 for the front cable disc brake illustrated in FIGS. 2 and 4–6.
Figure 49:
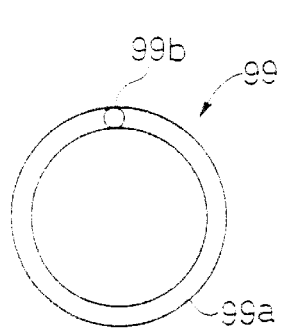
FIG. 49 is an end elevational view of the return spring for the actuating assembly of the front cable disc brake illustrated in FIGS. 2 and 4–6.
Figure 50:
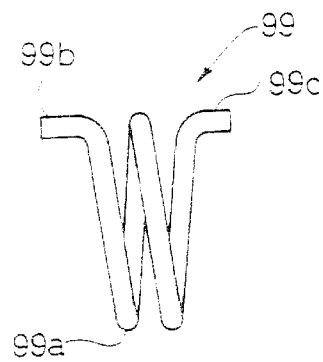
FIG. 50 is a side elevational view of the return spring illustrated in FIG. 49 for the actuating assembly of the front cable disc brake illustrated in FIGS. 2 and 4–6.
Figure 51:
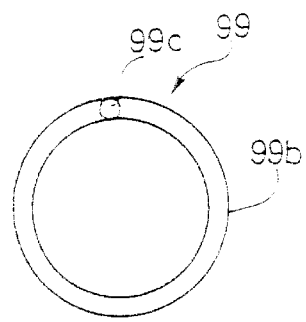
FIG. 51 is an end elevational view of the return spring illustrated in FIGS. 49 and 50 for the actuating assembly of the front cable disc brake illustrated in FIGS. 2 and 4–6.

As seen in FIG. 5, the return spring 93 for the output cam 91 is located between the output cam 91 and the output cam rotation stopper 94. Preferably, the return spring 93 is a conically-shaped compression spring (as seen in FIGS. 42 and 43) that has an inner diameter at its small end 93a that is substantially equal to the outer width of the thrust shaft 91b of the output cam 91, and an outer diameter at its large end 93b that is substantially equal to or slightly smaller than the inner diameter of the second section 52 of the left caliper portion 38. When the cable disc brake 12a is assembled, the return spring 93 should not be compressed, or only under a slight amount of compression. However, this compression should not be such that it has a biasing force of the return spring 93 that is greater than the biasing force of the pad spring 87. In other words, the biasing force of the output cam return spring 93, relative to the biasing force of the pad spring 87 in its normal rest position, should not compress the pad spring 87.

The actuating assembly 36 basically includes an actuating arm 98, a return spring 99 and a cover 100 that are secured on the first end 48 of the left caliper portion 38 via the nut 97. The actuating assembly 36 basically includes an actuating arm 98 that is fixedly secured to the third section 90h of the operating shaft 90b of the input cam 90.

As seen in FIGS. 44–48, the actuating arm 98 has a cylindrical main portion 98a with an outwardly extending cable mounting portion 98b. The central mounting portion 98a has a step-shaped bore 98c extending therethrough with a first cylindrical section 98d and a second non-cylindrical section 98e. An abutment surface 98f is formed between the first cylindrical section 98d and the second non-cylindrical section 98e. This abutment surface 98f has three bores 102 for mounting the return spring 99 thereto. Preferably, the centers of the bores 56 are spaced approximately twenty-five degrees apart in a circumferential direction.

As seen in FIGS. 2 and 4, the cable mounting portion 98b has a threaded bore 98g at its free end for receiving a clamping bolt 103 with a clamping plate 104 to secure the end of the inner wire 25a of the cable 19a thereto. Preferably, the cable mounting portion 98b also has a recess 98h around the threaded bore 98g for receiving the clamping plate 104, and to prevent relative rotation of the clamping plate 104. A projection 98i is formed at the free end in the direction of the inner wire 25a of the cable 19a. This projection 98i has a curved surface for supporting the inner wire 25a of the cable 19a during rotation of the actuating arm 98.

As seen in FIGS. 5, 6 and 49–51, the return spring 99 is preferably a torsion spring having a coil portion 99a with first and second ends 99b and 99c extending in opposite axial directions from the coil portion 99b. The first end 99c is received in one of the bores 56 of the left caliper portion 38, while the second end 99c of the return spring 99 is received in one of the bores 102 of the actuating arm 98. The first and second ends 99b and 99c are preferably longitudinally aligned with each other in the rest position.

The bores 56 and 102 form an adjustment mechanism for controlling the biasing force of the return spring 99 on the actuating arm 98. The biasing force between the caliper housing 30 and the actuating arm 98 can be adjusted by selecting various combinations of the bores 56 and 102. If both the first and second ends 99b and 99c of the return spring 99 are moved one hole in the same direction, then a 5° adjustment can be attained. For example, if the first and second ends 99b and 99c are located in the center bores 56 and 102, then either direction will result in a ±5° change in the biasing or urging force of the return spring 99. Of course, the first and second ends 99b and 99c can be adjusted independently for greater adjustment.

Moreover, it will be apparent to those skilled in the art from this disclosure that additional hole bores 56 and 102 can be provided for additional adjustment. Moreover, the angular spacing of the bores 56 and 102 can be changed as needed and/or desired. In any event, the angular spacing between the bores 56 and the angular spacing between bores 102 are preferably different from each other to provide for a small incremental adjustment of the return spring 99. As seen in FIG. 4, only five of the bores 56 and 102 are illustrated since one of the bores 56 is axially aligned with one of the bores 102.

When the cable disc brake 12a is in the assembled position, the return spring 99 normally biases the input cam 90 and the actuating arm 98 to a brake releasing position. When the rider squeezes the brake lever 21a, the inner wire 25a of the cable 19a moves relative to the outer casing 24a of the cable 19a to cause the actuating arm 98 and the input cam 90 to rotate together. This rotation causes the rolling members 92 to move from the deep ends of the camming slots 90e and 91d to the shallow ends of the camming slots 90e and 91d. As the rolling members 92 move within the camming slots 90e and 91d, the output cam 91 is moved in an axial direction against the biasing force of the output cam return spring 93. This axial movement of the output cam 91 causes the left brake pad 32 to move against the urging force of the pad spring 87 to engage the rotor 20a, which is then pressed against the right brake pad 32. This engagement of the brake pads 32 with the disc brake rotor 20a causes the braking action of the cable disc brake 12a.

Figure 52:
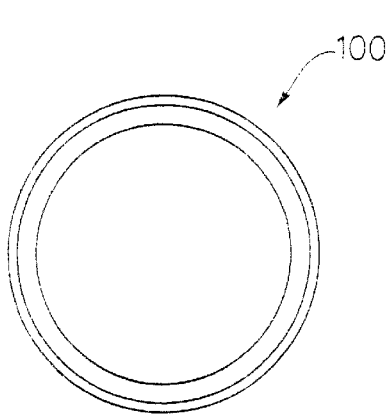
FIG. 52 is an end elevational view of the cover of the actuating assembly for the front cable disc brake illustrated in FIGS. 2 and 4–6.
Figure 53:
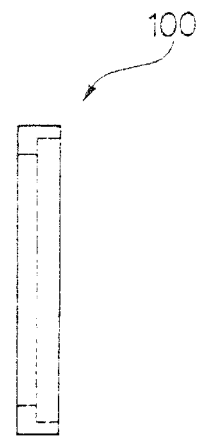
FIG. 53 is a side elevational view of the front cover illustrated in FIG. 52 for the front cable disc brake illustrated in FIGS. 2 and 4–6.

Referring now to FIGS. 5, 52 and 53, a cover 100 is located between the actuating arm 98 and the first end 48 of the left caliper portion 38. Preferably, this cover 100 fits on the outer annular end surface 54 of the first end 48 of the left caliper portion 38 so as to seal the space between the actuating arm 98 and the left caliper portion 38.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A cable disc brake comprising:
   a caliper housing;
   a first friction member movably coupled to said caliper housing between a release position and a braking position;
   a second friction member coupled to said caliper housing and arranged substantially parallel to said first friction member to form a rotor receiving slot therebetween; and
   an actuated mechanism movably coupled to said caliper housing to move said first friction member in an axial direction from said release position towards said second friction member to said braking position, said actuated mechanism including
      an input cam movably mounted within said caliper housing to move in a rotational direction about a longitudinal axis, but not in an axial direction, said input cam having a first camming surface with an axially extending guide member non-movably fixed thereto at said longitudinal axis, and
      an output cam movably mounted within said caliper housing to move in the axial direction in response to rotation of said input cam, but not in the rotational direction, said output cam having a second camming surface with an axially extending bore, said guide member being at least partially disposed within said bore to ensure smooth relative movement between said input and output cams.

2. A cable disc brake according to claim 1, wherein said guide member is formed by a pin extending from said input cam into said bore of said output cam.

3. A cable disc brake according to claim 2, wherein said pin is integrally formed with said input cam.

4. A cable disc brake according to claim 2, wherein said first camming surface of said input cam has a set of first camming slots, said second camming surface of said output cam has a set of second camming slots with rolling members located between said first and second camming slots.

5. A cable disc brake according to claim 4, wherein said rolling members are balls and said first and second camming slots are circumferentially extending ramp-shaped slots.

6. A cable disc brake according to claim 1, wherein said actuated mechanism further includes an actuating arm operatively coupled to said input cam.

7. A cable disc brake according to claim 6, wherein said actuating arm is biased to a release position by a biasing member.

8. A cable disc brake according to claim 7, wherein said biasing member is a torsion spring with a first end coupled to said caliper housing a second end coupled to said actuating arm.

9. A cable disc brake according to claim 8, wherein said actuated mechanism includes a return spring arranged to bias said first and second cam members together.

10. A cable disc brake according to claim 9, wherein said actuating arm has a cable attachment member thereon.

11. A cable disc brake comprising:
    a caliper housing;
    a first friction member movably coupled to said caliper housing between a release position and a braking position;
    a second friction member coupled to said caliper housing and arranged substantially parallel to said first friction member to form a rotor receiving slot therebetween; and
    an actuated mechanism movably coupled to said caliper housing to move said first friction member from said release position towards said second friction member to said braking position, said actuated mechanism having first and second cam members movably arranged between an axially retracted position and an axially extended position with a guide member interconnecting said first and second cam members during movement between said axially retracted position and said axially extended position, said guide member being non-movable in the axial direction relative to said caliper housing,
    said first cam member being rotatably mounted within said caliper housing, but non-movably mounted in the axial direction, and said second cam member being movably mounted in the axial direction but non-rotatably mounted.

12. A cable disc brake according to claim 11, wherein said guide member is formed by a pin extending from one of said first and second cam members into a bore of the other of said first and second cam members.

13. A cable disc brake according to claim 12, wherein said pin is located along an axis of rotation of said first and second cam members.

14. A cable disc brake according to claim 13, wherein said actuated mechanism further includes an actuating arm coupled to said first cam member.

15. A cable disc brake according to claim 14, wherein said actuating arm is biased to a release position by a biasing member.

16. A cable disc brake according to claim 15, wherein said biasing member is a torsion spring with a first end coupled to said caliper housing a second end coupled to said actuating arm.

17. A cable disc brake according to claim 16, wherein said actuated mechanism includes a return spring arranged to bias said first and second cam members together.

18. A cable disc brake according to claim 17, wherein said actuating arm has a cable attachment member thereon.

19. A cable disc brake according to claim 11, wherein said first cam member has a set of first camming surfaces, said second cam member has a set of second camming surfaces with rolling members located between said first and second camming surfaces.

20. A cable disc brake according to claim 19, wherein said rolling members are balls and said first and second camming surfaces include ramp-shaped slots.

21. A cable disc brake according to claim 1, wherein said input cam includes a first cam member disposed within an internal bore of said caliper housing.

22. A cable disc brake according to claim 21, wherein said input cam further includes an operating shaft that extends axially from said first cam member, and said operating shaft is operatively coupled to an actuating arm.

23. A cable disc brake according to claim 22, wherein said operating shaft at least partially extends outwardly from said caliper housing, and said actuating arm is disposed on an opposite side of said caliper housing from said internal bore of said caliper housing.

24. A cable disc brake according to claim 22, wherein said input cam further includes a bushing mounted on said operating shaft of said input cam.

25. A cable disc brake according to claim 24, wherein said bushing includes a cylindrical portion at least partially surrounding said operating shaft and a flange portion extending from said cylindrical portion, and said flange portion is located axially between a portion of said input cam and said caliper housing within said internal bore of said caliper housing.

26. A cable disc brake according to claim 21, wherein said output cam includes a second cam member with a non-circular thrust shaft extending axially therefrom, and said thrust shaft is received in a non-circular hole of a rotation stopper.

27. A cable disc brake according to claim 26, wherein said rotation stopper includes a radially extending tab that is received in an axial slot of said caliper housing to prevent rotation of said rotation stopper.

28. A cable disc brake according to claim 27, wherein said rotation stopper is secured on said thrust shaft of said output cam by a retainer.

29. A cable disc brake according to claim 28, wherein said retainer is a c-shaped snap ring that is received in an annular groove of said internal bore of said caliper housing.

30. A cable disc brake according to claim 26, wherein said actuated mechanism includes a return spring disposed between said rotation stopper and a portion of said output cam.

31. A cable disc brake according to claim 16, wherein said torsion spring is adjustably coupled to said caliper housing and said actuating arm to adjust the biasing force of said torsion spring.

32. A cable disc brake according to claim 22, wherein said actuated mechanism includes a cover disposed between said actuating arm and said caliper housing to seal said internal bore of said caliper housing.

33. A cable disc brake according to claim 32, wherein said actuating arm is biased to a release position by a biasing member arranged between said cover and said caliper housing.

34. A cable disc brake according to claim 17, wherein said return spring is a separate member from said biasing member.

35. A cable disc brake according to claim 34, wherein said return spring is located axially on an opposite side of said input and output cams from said biasing member.

36. A cable disc brake according to claim 1, wherein said axially extending bore of said output cam is a blind bore.

* * * * *